United States Patent
Nohara

(10) Patent No.: US 12,286,959 B2
(45) Date of Patent: Apr. 29, 2025

(54) WIND TURBINE DRIVE CONTROL DEVICE AND CONTROL METHOD OF WIND TURBINE DRIVE

(71) Applicant: Nabtesco Corporation, Tokyo (JP)

(72) Inventor: Osamu Nohara, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 18/174,296

(22) Filed: Feb. 24, 2023

(65) Prior Publication Data

US 2023/0243335 A1    Aug. 3, 2023

Related U.S. Application Data

(62) Division of application No. 17/126,503, filed on Dec. 18, 2020, now Pat. No. 11,614,072.

(30) Foreign Application Priority Data

Dec. 25, 2019   (JP) ................................. 2019-234146

(51) Int. Cl.
   *F03D 7/02*   (2006.01)
(52) U.S. Cl.
   CPC ......... *F03D 7/0244* (2013.01); *F03D 7/0212* (2013.01); *F03D 7/0224* (2013.01)
(58) Field of Classification Search
   CPC ..... F03D 7/0212; F03D 7/0224; F03D 7/0244
   See application file for complete search history.

(56) References Cited

U.S. PATENT DOCUMENTS 8,022,564 B2   9/2011 Nohara
9,869,298 B2 * 1/2018 Rosenvard ............ F03D 7/0224
(Continued)

FOREIGN PATENT DOCUMENTS

CN       1836104 A    9/2006
CN     106762412 A    5/2017
(Continued)

OTHER PUBLICATIONS

Notice of Reasons for Refusal dated May 23, 2023, issued in corresponding Japanese Patent Application No. 2019-234146 with English translation (10 pgs.).

(Continued)

*Primary Examiner* — David E Sosnowski
*Assistant Examiner* — Jason G Davis
(74) *Attorney, Agent, or Firm* — Pillsbury Winthrop Shaw Pittman, LLP

(57) ABSTRACT

A wind turbine drive control device according to one aspect of the present invention is a wind turbine drive control device for controlling at least one drive device for moving two structures included in a wind power generation device relative to each other, the wind turbine drive control device including: an obtaining unit for obtaining information related to a load occurring between the at least one drive device and one of the two structures that receives a force generated by the at least one drive device; and a control unit for controlling the at least one drive device so as to cause a force generated by the at least one drive device to be reduced or zero based on the information related to the load obtained by the obtaining unit during a stop period in which the two structures are stopped relative to each other.

7 Claims, 13 Drawing Sheets

(56) References Cited

U.S. PATENT DOCUMENTS

| | | | |
|---|---|---|---|
| 2006/0205554 A1 | 9/2006 | Nohara et al. | |
| 2010/0209246 A1 | 8/2010 | Migliori | |
| 2011/0299975 A1 | 12/2011 | Pechlivanoglou | |
| 2011/0309620 A1 | 12/2011 | Fujino et al. | |
| 2013/0099494 A1* | 4/2013 | Numajiri | F03D 7/0212 290/44 |
| 2013/0170989 A1 | 7/2013 | Trede et al. | |
| 2016/0305407 A1 | 10/2016 | Osako | |
| 2018/0187646 A1 | 7/2018 | Arlaban Gabeiras et al. | |
| 2019/0203697 A1 | 7/2019 | Nohara et al. | |
| 2019/0293055 A1 | 9/2019 | Nohara et al. | |
| 2019/0390651 A1* | 12/2019 | Nohara | G01L 5/00 |

FOREIGN PATENT DOCUMENTS

| | | | | |
|---|---|---|---|---|
| CN | 110159483 A | 8/2019 | | |
| EP | 3165764 A1 | 5/2017 | | |
| EP | 3450745 A1 | 3/2019 | | |
| JP | 2005-113900 A | 4/2005 | | |
| JP | 2011-127551 A | 6/2011 | | |
| JP | 2015-140777 A | 8/2015 | | |
| JP | 2019-078223 A | 5/2019 | | |
| KR | 10-2014-0039823 A | 4/2014 | | |
| KR | 10-1685850 B1 | 12/2016 | | |
| WO | WO-2017215724 A1 | * | 12/2017 | ........... F03D 7/0204 |
| WO | WO-2018008753 A1 | * | 1/2018 | ............. F03D 15/10 |

OTHER PUBLICATIONS

Extended European Search Report dated May 21, 2021, issued in corresponding European Application No. 20215478.7.

Notification of First Office Action dated Nov. 7, 2023, issued in corresponding Chinese Patent Application No. 202011538126.6 with English translation (28 pages).

Zhang Xinwang, On Backlash and Adjustment of Yaw Bearings of Wind Turbine Generators, Wind Energy Magazine, Issue No. 5, May 6, 2016, 3 pgs.

Notice of Allowance dated Mar. 29, 2024, issued in corresponding Chinese Patent Application No. 202011538126.6 with English translation (8 pgs.).

\* cited by examiner

WIND TURBINE DRIVE CONTROL DEVICE AND CONTROL METHOD OF WIND TURBINE DRIVE

CROSS-REFERENCE TO RELATED APPLICATIONS

This application is a Divisional application of U.S. Ser. No. 17/126,503 (filed Dec. 18, 2020), which is based on and claims the benefit of priority from Japanese Patent Application Serial No. 2019-234146 (filed on Dec. 25, 2019), the contents of each of which are hereby incorporated by reference in their entirety.

TECHNICAL FIELD

The present invention relates to a wind turbine drive control device and a control method of a wind turbine drive device.

BACKGROUND

Some of conventionally known wind power generation devices have a yaw control function for adjusting the orientation of a blade in accordance with the wind direction. An example of such wind power generation devices is disclosed in Japanese Patent Application Publication No. 2015-140777 ("the 777 Publication"). The wind power generation device disclosed in the 777 Publication is installed on the land or on the ocean, and it includes a tower serving as a support post for a power generator, a nacelle disposed on top of the tower and containing the power generator, and a rotor disposed on one end of the nacelle and formed of a hub and a blade for converting the received wind force into rotation energy. This wind power generation device includes a yaw drive unit disposed in a connection portion between the tower and the nacelle and configured to control the positions of the nacelle and the rotor relative to the tower. The 777 Publication discloses that the provided wind power generation device has a high availability, which is achieved by the yaw drive unit that stops transmission of a yaw drive force to minimize an impact of yaw control failure due to malfunctions of the yaw drive device.

In the above wind power generation device, when fixation occurs between a yaw bearing gear and a pinion gear due to gear deformation caused by strong winds such as those of a typhoon, the transmission of the yaw drive force from the pinion gear to the yaw bearing gear is stopped. In the above wind power generation device, the fixation between the yaw bearing gear and the pinion gear is detected when the electric current in the yaw inverter exceeds a rated current or a predetermined interlock value.

However, in the wind power generation device, the load between the pinion gear and the yaw bearing gear may change during the turning of the nacelle for adjusting the orientation of the blade, as well as during the stop period of the nacelle in which the orientation of the blade is fixed. Such a change in the load may cause a malfunction.

SUMMARY

The present invention addresses the above drawback, and one object thereof is to provide a wind turbine drive control device and a control method of a wind turbine drive device that are capable of reducing the load occurring in the stop period.

To achieve the above object, a wind turbine drive control device according to one aspect of the present invention is a wind turbine drive control device for controlling at least one drive device for moving two structures included in a wind power generation device relative to each other, the wind turbine drive control device comprising: an obtaining unit for obtaining information related to a load occurring between the at least one drive device and one of the two structures that receives a force generated by the at least one drive device; and a control unit for controlling the at least one drive device so as to cause a force generated by the at least one drive device to be reduced or zero based on the information related to the load obtained by the obtaining unit during a stop period in which the two structures are stopped relative to each other. With this configuration, the load can be reduced during the stop period in accordance with the information related to the load.

In the above wind turbine drive control device, the information related to the load may be information based on a force acting on a fastener fixing the at least one drive device to one of the two structures. With this configuration, the information related to the load can be obtained using the force acting on the fastener.

To achieve the above object, a wind turbine drive control device according to one aspect of the present invention is a wind turbine drive control device for controlling at least one drive device for moving two structures included in a wind power generation device relative to each other, the wind turbine drive control device comprising: a control unit for controlling the at least one drive device so as to cause a force generated by the at least one drive device to be reduced or zero when a predetermined timing is reached during a stop period in which the two structures are stopped relative to each other. With this configuration, the load occurring in the stop period can be reduced before the stop period is ended.

In the above wind turbine drive control device, the predetermined timing may be a timing reached at regular intervals within the stop period. With this configuration, the load occurring in the stop period can be reduced at regular intervals.

In the above wind turbine drive control device, the predetermined timing may be a timing reached a predetermined amount of time before a start of a drive period in which the two structures are moved relative to each other. With this configuration, the load can be reduced during the stop period, a predetermined amount of time before the start of the drive period.

In the above wind turbine drive control device, the predetermined timing may be a timing reached a predetermined amount of time after an end of a drive period in which the two structures are moved relative to each other. With this configuration, the load can be reduced during the stop period, a predetermined amount of time after the end of the drive period.

In the above wind turbine drive control device, the at least one drive device may comprise a plurality of drive devices, each controlled by the wind turbine drive control device. In this case, the obtaining unit obtains information related to the load occurring between each of the plurality of drive devices and one of the two structures that receives forces generated by the plurality of drive devices, and the control unit controls the plurality of drive devices so as to cause a force generated by at least one of the plurality of drive devices to be reduced or zero based on the information related to the load obtained by the obtaining unit during the stop period in which the two structures are stopped relative to each other. With this configuration, the load can be reduced during the stop period in accordance with the information related to the load.

To achieve the above object, a wind turbine drive control device according to one aspect of the present invention is a wind turbine drive control device for controlling a plurality of drive devices each including a brake unit and a drive unit, the brake unit being configured to generate a braking force for stopping a second structure relative to a first structure, both the first and second structures being included in a wind power generation device, the drive unit being configured to generate a drive force for moving the second structure relative to the first structure, the wind turbine drive control device comprising: a control unit configured to switch between a drive period in which the second structure is moved relative to the first structure and a stop period in which the second structure is stopped relative to the first structure, the control unit being further configured to control the plurality of drive devices so as to cause a force generated by at least one of the plurality of drive devices to be reduced or zero when a predetermined timing is reached during the stop period. With this configuration, the load can be reduced during the stop period in accordance with the information related to the load.

To achieve the above object, a control method according to one aspect of the present invention is a control method of a wind turbine drive device, for controlling a drive device for moving two structures included in a wind power generation device relative to each other, the control method comprising: obtaining information related to a load occurring between the drive device and one of the two structures that receives a force generated by the drive device; and controlling the drive device so as to cause a force generated by the drive device to be reduced or zero based on the information related to the load during a stop period in which the two structures are stopped relative to each other. With this method, the load can be reduced during the stop period in accordance with the information related to the load.

To achieve the above object, a control method according to one aspect of the present invention is a control method of a wind turbine drive device, for controlling a drive device for moving two structures included in a wind power generation device relative to each other, the control method comprising: controlling the drive device so as to cause a force generated by the drive device to be reduced or zero when a predetermined timing is reached during a stop period in which the two structures are stopped relative to each other. With this method, the load can be reduced during the stop period in accordance with the information related to the load.

Advantageous Effects

According to one aspect of the present invention, the load occurring in the stop period can be reduced.

DESCRIPTION OF THE PREFERRED EMBODIMENTS

With reference to the drawings, the following describes a wind turbine drive control device and a control method of a wind turbine drive device according to the embodiment.

Figure 1:
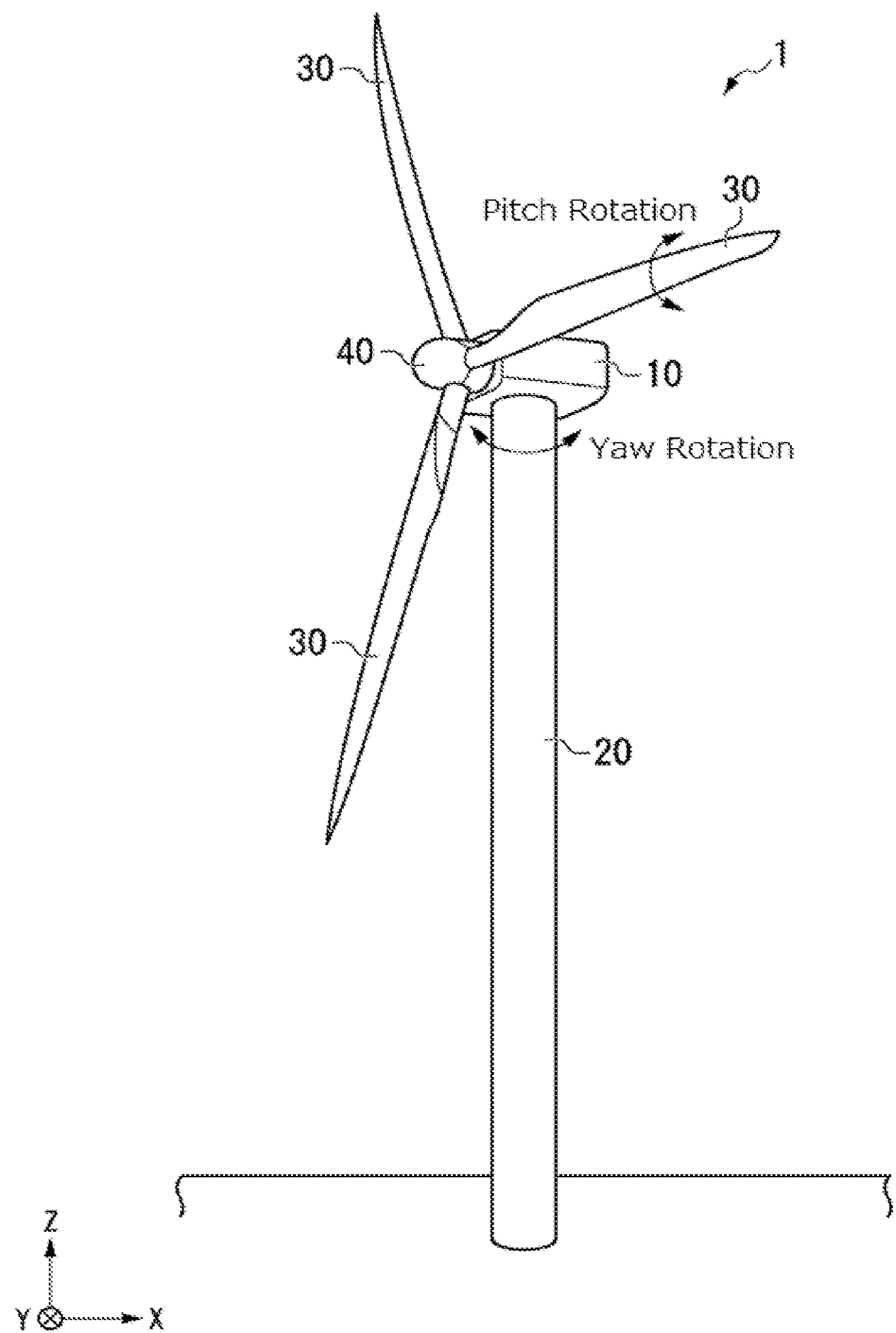
FIG. 1 is a perspective view showing an example of a wind power generation device according to an embodiment of the present invention.

FIG. 1 is a perspective view showing an example of a wind power generation device according to an embodiment of the present invention. The wind power generation device 1 includes, for example, a nacelle 10, a tower 20, a blade 30, and a hub 40. The tower 20 and the nacelle 10 are examples of two structures included in the wind power generation device 1. The tower 20 and the nacelle 10 move relative to each other by a force from drive devices (yaw drive devices 100). The tower 20 is an example of a first structure that is a part of the wind power generation device 1 installed fixedly. The nacelle 10 is an example of a second structure that moves relative to the first structure by the drive force from the yaw drive devices 100 and stops relative to the first structure by the braking force from the yaw drive devices 100.

The nacelle 10 is mounted on the top end (the end in the Z direction) of the tower 20. The blade 30 is mounted to the nacelle 10 via the hub 40. The nacelle 10 turns to adjust the orientation of the blade 30 and the hub 40 in the yaw direction. The nacelle 10 includes yaw drive devices for generating a yaw drive force for rotating the nacelle 10 in the yaw direction. The yaw drive devices are an example of drive devices and wind turbine drive devices. The drive devices and the wind turbine drive devices generate a force for rotating the orientation of the blade 30 and the hub 40 (the orientation of a wind turbine) in accordance with the wind direction. The tower 20 is embedded on the land or on the sea. The tower 20 extends upward in a vertical direction from the land or the sea. The nacelle 10 is mounted on the top end of the tower 20. The tower 20 includes a blade gear (not shown) for driving the turning of the nacelle 10 in the yaw direction. The nacelle 10 is an example of a structure not provided with a force generated by the drive devices. The tower 20 is an example of a structure provided with a force generated by the drive devices.

The blade 30 receives wind force and generates a rotational force. In the embodiment, three blades 30 are provided.

The hub 40 is mounted to the nacelle 10, and a plurality of blades 30 are mounted to the hub 40. The hub 40 transmits to a rotating shaft the rotational force (motive power) generated by the wind force received by the blades 30. The hub 40 transmits the rotational force based on the wind force to the nacelle 10 via the rotating shaft.

The hub 40 includes pitch drive mechanisms for generating a pitch drive force for rotating the blades 30 in the pitch direction. Each blade 30 is provided with a drive mechanism for generating a pitch drive force. The pitch drive mechanisms rotate the blades 30 in the pitch direction to control the angles of the blades 30 in accordance with the wind velocity.

In the wind power generation device 1, the motive power generated by the rotation of the blades 30 is transmitted from the hub 40 to a power generator (not shown) in the nacelle 10 and converted into an electric power. In this way, the wind power generation device 1 performs wind power generation.

Figure 2:
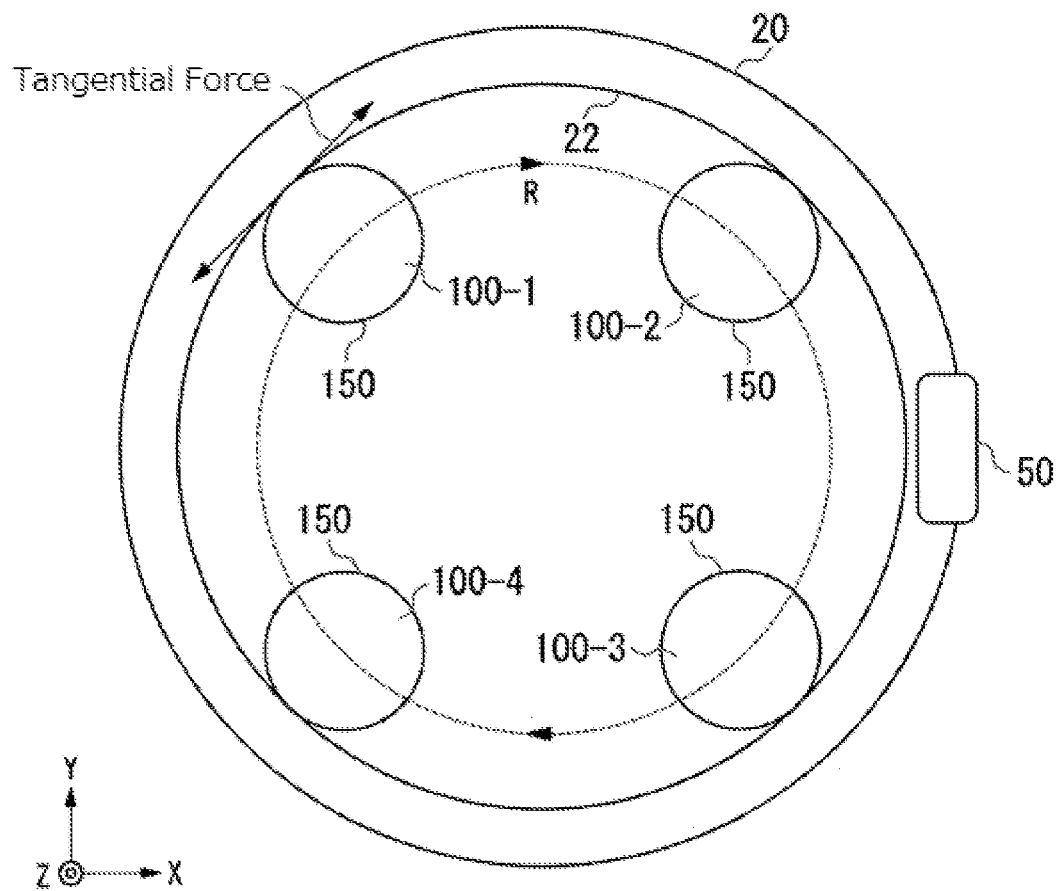
FIG. 2 is a top view showing a relationship between the tower and the yaw drive devices according to the embodiment.

FIG. 2 is a top view showing a relationship between the tower and the yaw drive devices according to the embodiment. The yaw drive devices 100 for generating the yaw drive force are mounted to the nacelle 10. In the embodiment, four yaw drive devices 100-1, 100-2, 100-3, and 100-4 are mounted to the nacelle 10. These yaw drive devices may be hereinafter collectively referred to simply as "the yaw drive devices 100." In FIG. 2, a ring gear 22 is formed in the inner wall of the tower 20. The ring gear 22 meshes with pinion gears 150 of the yaw drive devices 100. The yaw drive devices 100 revolve in the R direction in FIG. 2 by the motor drive force. The yaw drive devices 100 may also be able to revolve in the opposite direction to the R direction.

With the ring gear 22 and the pinion gears 150 meshing with each other, a force such as a gust of wind applied to the nacelle 10, the tower 20 or the like generates a tangential force between the ring gear 22 and the pinion gears 150. The tangential force is a force generated in the tangential direction of the gear forming surface of the ring gear 22. The tangential force applies a torsional stress to a speed reducing unit of each of the yaw drive devices 100. The tangential force applies a tensile stress and a compressive stress to a fastener in each of the yaw drive devices 100. In the embodiment, the ring gear 22 is provided in the tower 20 and the yaw drive devices 100 are fixed to the nacelle 10, but this example is not limitative. It is also possible that the nacelle 10 includes a gear portion corresponding to the ring gear 22, and the tower 20 includes yaw drive devices corresponding to the yaw drive devices 100.

Figure 3:
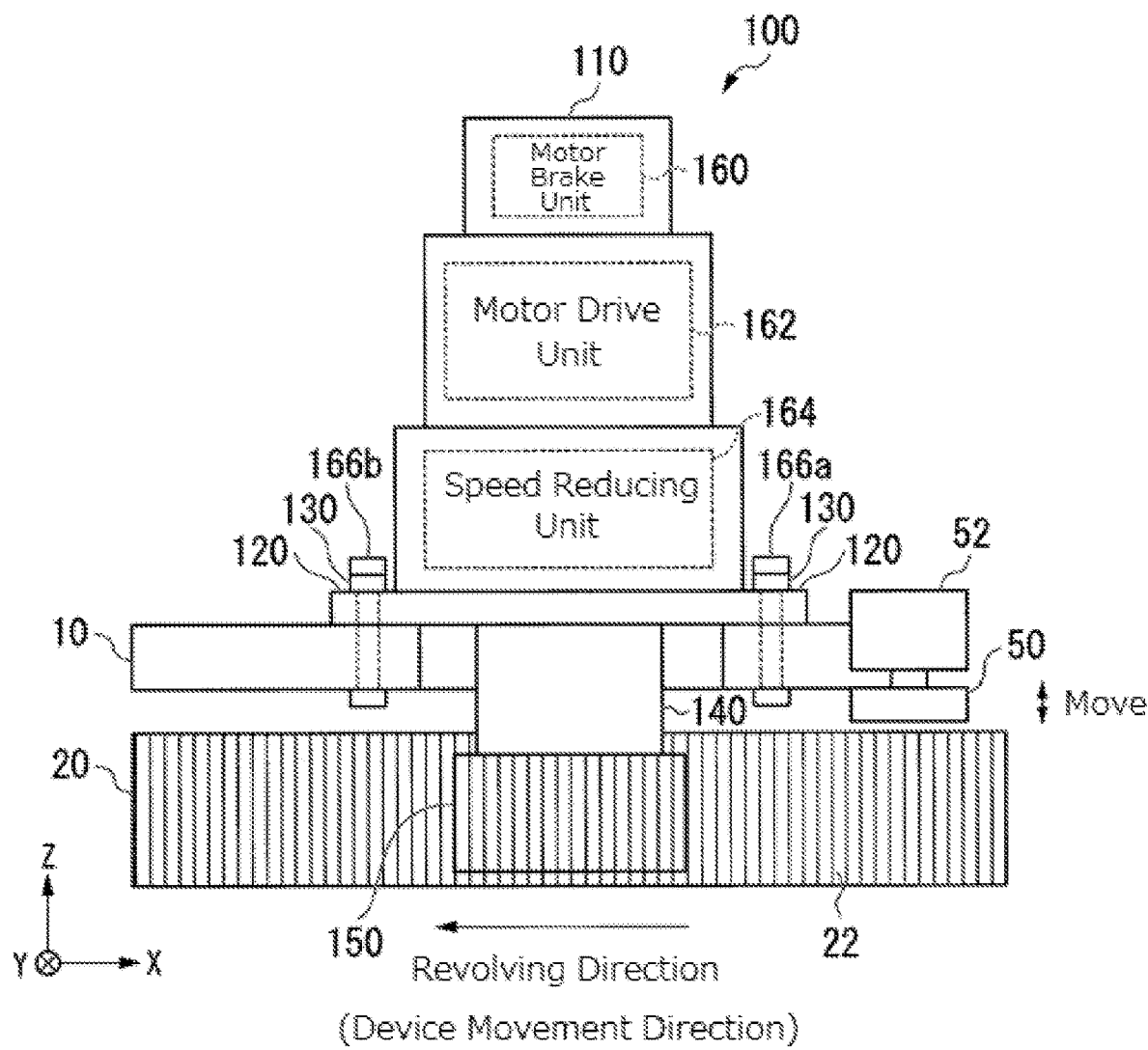
FIG. 3 shows an example of the yaw drive device according to the embodiment.

FIG. 3 shows an example of the yaw drive device according to the embodiment. The yaw drive device 100 includes, for example, a casing 110, a flange 120, fastening bolts 130, an output shaft 140, and a pinion gear 150. The flange 120 is mounted to the casing 110. The flange 120 is connected to the nacelle 10 with the fastening bolts 130. One end of the output shaft 140 is connected to the interior of the casing 110 and the flange 120, and the other end of the output shaft 140 has the pinion gear 150 provided thereon. The pinion gear 150 is positioned so as to mesh with the ring gear 22. The pinion gear 150 rotates by the drive force output from the output shaft 140 to cause the yaw drive device 100 to revolve in the revolving direction (device movement direction or reverse X direction). The yaw drive device 100 in turn causes the nacelle 10 to turn relative to the tower 20. The fastening bolts 130 are an example of the fasteners. The fasteners are elements for fixing the yaw drive device 100 to the nacelle 10. The fasteners are not limited to the fastening bolts 130 but may be other known members. The output shaft 140 and the pinion gear 150 are an example of a transmission unit. The transmission unit is an element for transmitting a drive force and a braking force from the yaw drive device 100 to the tower 20. If the drive device is fixed to the tower 20, the transmission unit is an element for transmitting the forces from the tower 20 to the nacelle 10.

The yaw drive device 100 includes a motor brake unit 160, a motor drive unit 162, and a speed reducing unit 164. The motor brake unit 160 generates a braking force for the output shaft 140. The motor brake unit 160 applies the braking force directly to the output shaft 140, but this is not limitative. It is also possible that the braking force is applied indirectly to the output shaft 140. For example, the force of the motor brake unit 160 may be applied to a member other than the output shaft 140 and then applied to the output shaft 140 from this member. The motor drive unit 162 generates a drive force for the output shaft 140. The motor brake unit 160 generates the braking force by an electromagnetic action in accordance with a control signal provided externally. The motor brake unit 160 serves as an electromagnetic brake. The motor drive unit 162 generates the drive force by an electromagnetic action in accordance with a control signal provided externally. The speed reducing unit 164 reduces the rotation speed according to the drive force generated by the output shaft 140 to increase the drive torque. The motor brake unit 160 and/or the motor drive unit 162 are an example of a force generation unit. The force generation unit generates a force. At least one of the yaw drive devices 100 is an example of the drive device. In the drive device, the force generation unit generates the force that is then transmitted to the transmission unit. In the embodiment, the yaw drive device 100 generate the drive force and the braking force, but this is not limitative. It is also possible to obtain a braking force by generating a drive force in an opposite direction to the direction of the drive force for rotating the nacelle 10. In such a case, the yaw drive device 100 does not need to include the motor brake unit 160.

Further, the yaw drive device 100 includes a strain sensor 166a and a strain sensor 166b. The strain sensors 166 are an example of an obtaining unit for obtaining information on the load. The strain sensor 166a and the strain sensor 166b may be hereinafter collectively referred to simply as "the strain sensors 166." The strain sensors 166 output a signal in accordance with a strain occurring in the fastening bolts 130. The strain occurring in the fastening bolts 130 changes in accordance with the tangential force. In the embodiment, the strain in the fastening bolts 130 is detected as the information on the load, but this is not limitative. It is also possible to detect a torque occurring between the output shaft 140 and the ring gear 22. In the yaw drive device 100, for example, the torque may be detected by measuring the amount of force acting on the output shaft 140. Further, the yaw drive device 100 may include a torque meter for sensing torsion in the output shaft 140 that connects between the motor drive unit 162 and the motor brake unit 160, such that an output signal from the torque meter can be obtained as information on the load. Further, the yaw drive device 100 may include a strain gauge disposed at the base of a gear such as the pinion gear 150 for transmitting the drive force or the braking force, such that an output signal from the strain gauge can be obtained as information on the load. Further, in the yaw drive device 100, a difference between the output torsion angle of the output shaft 140 and an input torsion angle of the output shaft 140 may be sensed, such that the information indicating the sensed difference can be obtained as information on the load. The output torsion angle of the output shaft 140 is a torsion angle of the output shaft 140 near the motor brake unit 160 or the motor drive unit 162, and the input torsion angle of the output shaft 140 is a torsion angle of the output shaft 140 near the pinion gear 150.

The wind power generation device 1 includes a hydraulic brake for applying a braking force to the ring gear 22. The hydraulic brake is, for example, a caliper brake mechanism. The hydraulic brake includes a hydraulic brake driving unit 52 and a friction member 50. The hydraulic brake driving unit 52 moves the friction member 50 in the Z direction in FIG. 3 in accordance with a control signal provided externally. The hydraulic brake driving unit 52 applies a braking force to the ring gear 22 by urging the friction member 50 against the ring gear 22. The wind power generation device 1 is preferably capable of adjusting the braking force applied to the ring gear 22.

Figure 4:
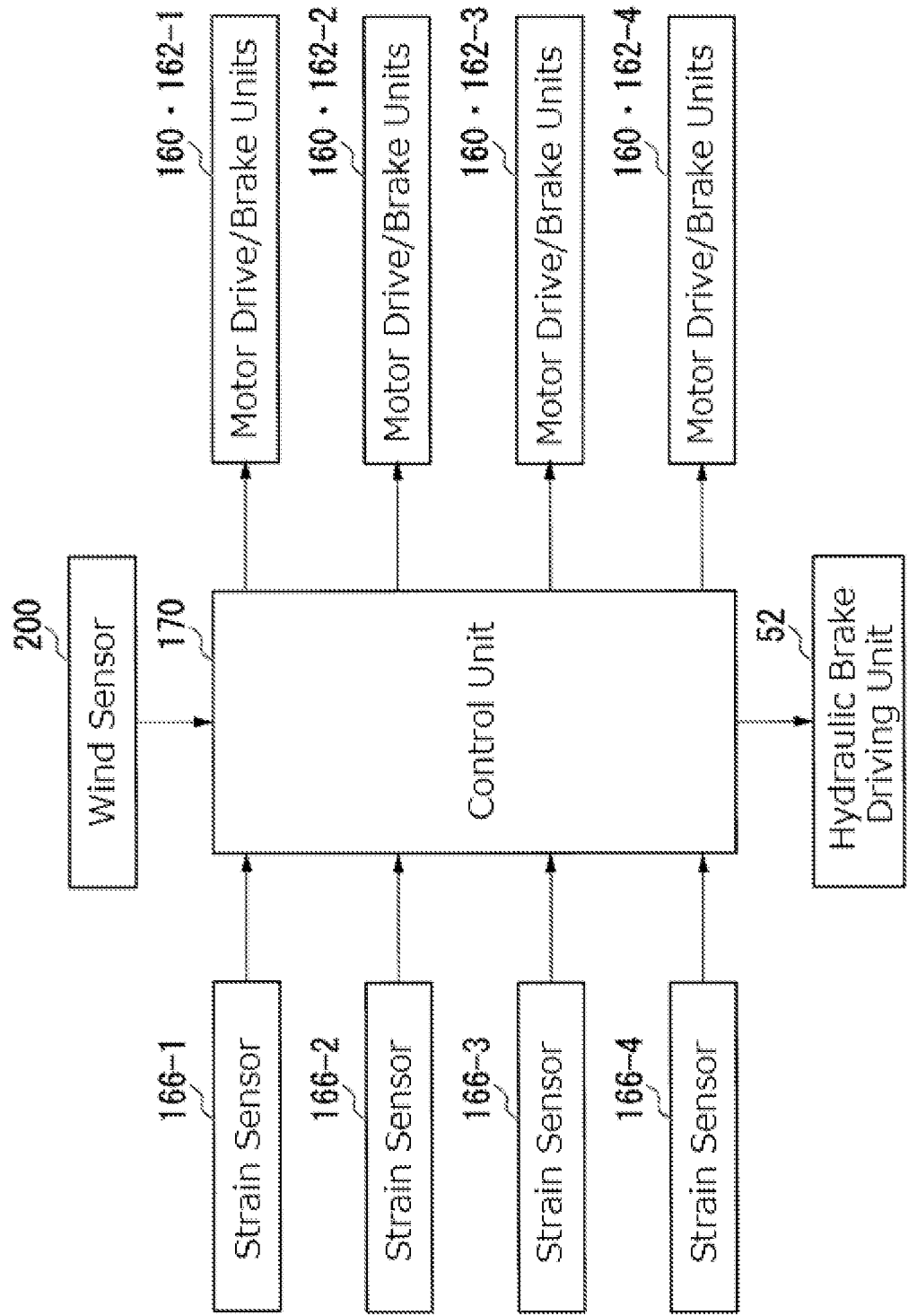
FIG. 4 is a block diagram showing an example of functionality of the wind power generation device according to the embodiment.

FIG. 4 is a block diagram showing an example of functionality of the wind power generation device according to the embodiment. FIG. 4 shows an example of functionality for controlling the yaw drive force in the wind power generation device 1. The wind power generation device 1 includes, for example, a control unit 170, strain sensors 166-1, 166-2, 166-3, 166-4, motor drive/brake units 160/162-1, 160/162-2, 160/162-3, 160/162-4, a hydraulic brake driving unit 52, and a wind sensor 200.

The strain sensor 166-1 corresponds to the strain sensor 166a and the strain sensor 166b in the yaw drive device 100-1. The strain sensor 166-2 corresponds to the strain sensor 166a and the strain sensor 166b in the yaw drive device 100-2. The strain sensor 166-3 corresponds to the strain sensor 166a and the strain sensor 166b in the yaw drive device 100-3. The strain sensor 166-4 corresponds to the strain sensor 166a and the strain sensor 166b in the yaw drive device 100-4. Each of the yaw drive devices 100 may include more than one strain sensors 166.

The motor drive/brake unit 160/162-1 corresponds to the motor brake unit 160 and the motor drive unit 162 in the yaw drive device 100-1. The motor drive/brake unit 160/162-2 corresponds to the motor brake unit 160 and the motor drive unit 162 in the yaw drive device 100-2. The motor drive/brake unit 160/162-3 corresponds to the motor brake unit 160 and the motor drive unit 162 in the yaw drive device 100-3. The motor drive/brake unit 160/162-4 corresponds to the motor brake unit 160 and the motor drive unit 162 in the yaw drive device 100-4.

The wind sensor 200 is disposed, for example, on the top surface of the nacelle 10. The wind sensor 200 generates a signal (wind sensing signal) that indicates the wind strength and the wind direction and provides this signal to the control unit 170.

The control unit 170 is formed of, for example, a processor such as a CPU (Central Processing Unit) executing a program stored on a program memory. The control unit 170 may alternatively be formed of hardware such as a LSI (Large Scale Integration), an ASIC (Application Specific Integrated Circuit), or a FPGA (Field-Programmable Gate Array) or formed of software and hardware cooperating with each other. The control unit 170 receives a strain sensing signal from each of the strain sensors 166-1, 166-2, 166-3, and 166-4. The control unit 170 receives a wind sensing signal from the wind sensor 200. The control unit 170 outputs control signals to the motor drive/brake units 160/162-1, 160/162-2, 160/162-3, 160/162-4, and the hydraulic brake driving unit 52 based on the strain sensing signals and the wind sensing signal. The control unit 170 is an example of the wind turbine drive control device that causes the forces generated by the yaw drive devices 100 to be reduced or zero, but alternatively, the control unit 170 and the strain sensors 166 may be an example of the wind turbine drive control device.

Figure 5:
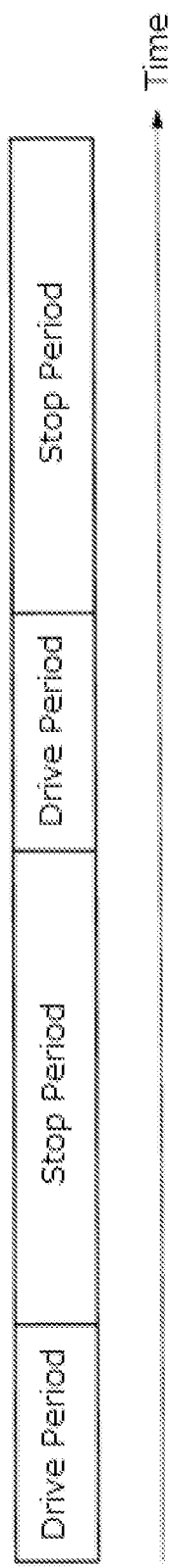
FIG. 5 shows periods of control according to the embodiment.

FIG. 5 shows periods of control according to the embodiment. As shown in FIG. 5 for example, the control unit 170 previously sets a drive period and a stop period. In the drive period, the orientation of the nacelle 10 is moved based on the direction of wind. In the stop period, the orientation of the nacelle 10 is fixed. In other words, the stop period is a period in which the two structures included in the wind power generation device are stopped relative to each other. During the drive period, the control unit 170 performs control for moving the nacelle 10 to a target position relative to the tower 20. During the stop period, the control unit 170 performs control for stopping the nacelle 10 at a target position relative to the tower 20. The target position is the optimal position of the nacelle 10 relative to the tower 20 determined based on the wind direction.

At the timing of starting the drive period, the control unit 170 starts control for moving the nacelle 10 to the target position relative to the tower 20. The control unit 170 positions the nacelle 10 at the target position by the timing of ending the drive period. The control unit 170 causes the braking force to be generated so as to fix the nacelle 10 at the target position during the stop period. In this way, the control unit 170 switches the control between the drive period and the stop period.

Figure 6:
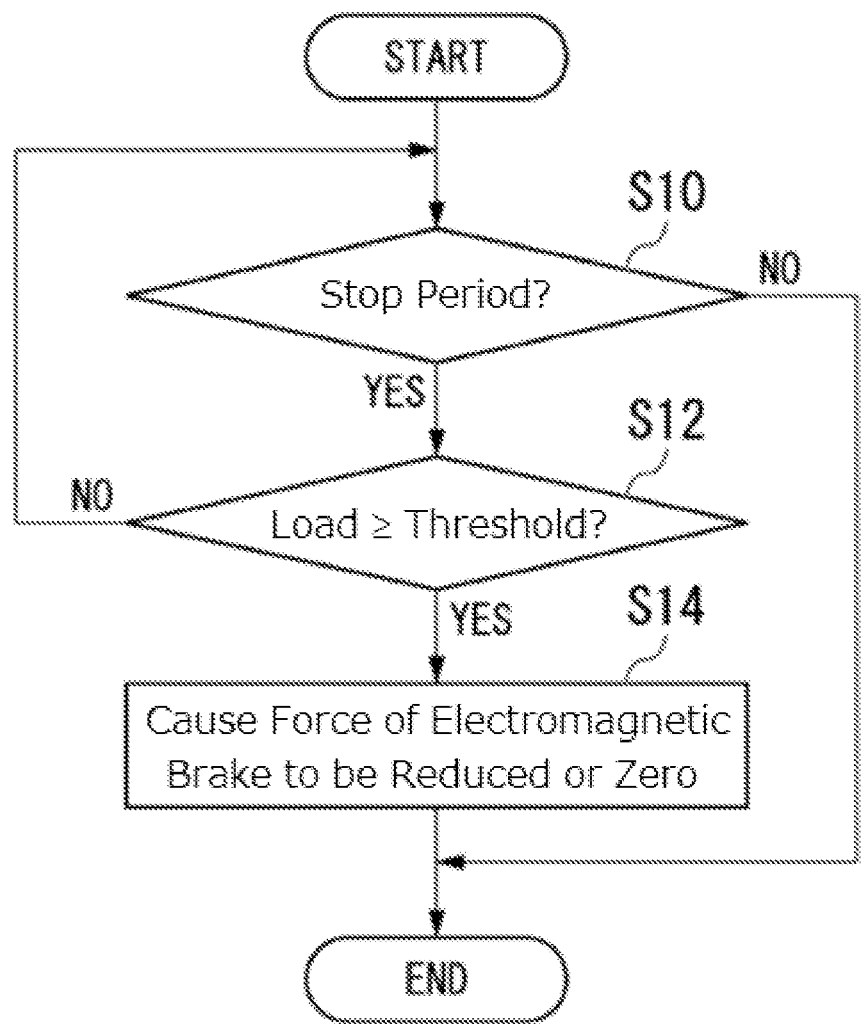
FIG. 6 is a flowchart showing an example of control based on the load during a stop period according to the embodiment.

The following describes the control in the yaw drive device 100 during the period in which the nacelle 10 (the second structure) is to be stopped relative to the tower 20 (the first structure). FIG. 6 is a flowchart showing an example of control based on the load during a stop period according to the embodiment. The control unit 170 first determines whether or not a stop period is ongoing (step S10). If a stop period is not ongoing at present (No in step S10), the control unit 170 ends the process of this flowchart. If the control unit 170 determines that a stop period is ongoing at present (Yes in step S10), then it determines whether or not the load is equal to or larger than a threshold value (step S12). The load is the values of the strain sensing signals obtained by the strain sensors 166, but this is not limitative. The load may be a value that impacts on the load occurring between the ring gear 22 and the pinion gear 150. For example, the load may alternatively be the wind strength sensed by the wind sensor 200. The threshold value is the upper limit of the strain sensing signals, but this is not limitative. The threshold value may alternatively be the upper limit of the wind strength.

If the load is not equal to or larger than the threshold value, the control unit returns to step S10. If the load is equal to or larger than the threshold value (Yes in step S12), the control unit 170 performs control to cause the force of the electromagnetic brake to be reduced or zero (step S14). In step S14, the control unit 170 causes the braking force of the electromagnetic brake to be reduced or zero, for example, for a period sufficiently shorter than the stop period or the drive period (e.g., several micro seconds). The operation in step S14 may be read as temporarily causing the force of the electromagnetic brake to be reduced or zero or read as stopping the operation of the electromagnetic brake.

Figure 7:
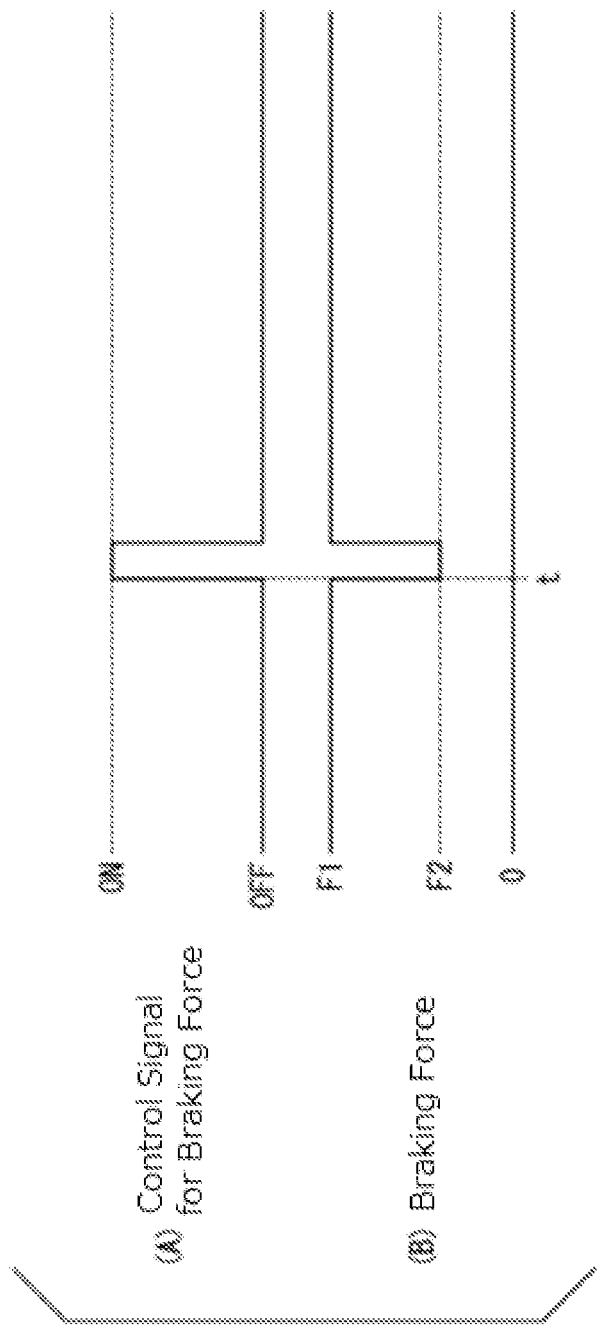
FIG. 7 shows an example of operation for controlling the braking force according to the embodiment. Part (A) of FIG. 7 shows a change in a control signal provided to a motor brake unit. Part (B) of FIG. 7 shows a change in the braking force on a ring gear.

FIG. 7 shows an example of operation for controlling the braking force according to the embodiment. Part (A) of FIG. 7 shows a change in a control signal provided to the motor brake unit 160. Part (B) of FIG. 7 shows a change in the braking force on the ring gear 22. Suppose that, in the wind power generation device 1, the ring gear 22 receives a braking force F1 that is a sum of the braking forces provided by the motor brake units 160 (electromagnetic brakes) and the braking force provided by the friction member 50. The braking force F1 is a braking force necessary to stop rotation of the pinion gears 150 and fix the pinion gears 150 to the ring gear 22.

In the wind power generation device 1, if it is determined that the load is equal to or larger than the threshold value during the stop period, the electromagnetic brakes are temporarily stopped. At this time, the control unit 170 provides a pulse signal to the motor brake units 160. In response to the pulse signal provided, the motor brake units 160 reduce the braking forces generated by the electromagnetic action. In this way, the braking forces of the electromagnetic brakes are temporarily removed, with the pinion gears 150 meshing freely with the ring gear 22, and the ring gear 22 temporarily receiving only the braking force F2 applied by the friction member 50. If the force corresponding to the load between the pinion gears 150 and the ring gear 22 does not exceed the braking force F2, the nacelle 10 is retained by the braking force F2, and the load accumulated in the speed reducing units 164 is reduced. If the force corresponding to the load between the pinion gears 150 and the ring gear 22 exceeds the braking force F2, the nacelle 10 is rotated. However, since the pinion gears 150 mesh freely with the ring gear 22, the rotation of the nacelle 10 does not cause the load to be accumulated in the speed reducing units 164. Thus, the load after revolution of the yaw drive devices 100 falls below the load before removal of the braking forces of the electromagnetic brakes. As a result, the wind power generation device 1 is capable of inhibiting a malfunction due to a change in the load during the stop period.

The phrase "reducing the braking force" encompasses reducing the current braking force of the electromagnetic brake to a value larger than zero and setting the current braking force of the electromagnetic brake at zero. The processes for reducing the braking force include a process of switching a control signal provided to the motor brake unit 160 from ON to OFF and a process of performing duty control of the control signal to reduce the amount of electric power necessary for the braking force of the electromagnetic brake.

By way of an example, the drive period may be several minutes, and the stop period may be ten-odd minutes. The period in which the braking force of the electromagnetic brake is temporarily reduced may be, for example, several micro seconds. The period in which the pulse signal is ON, which corresponds to the period in which the braking force of the electromagnetic brake is reduced, may be, for example, several micro seconds.

Figure 8:
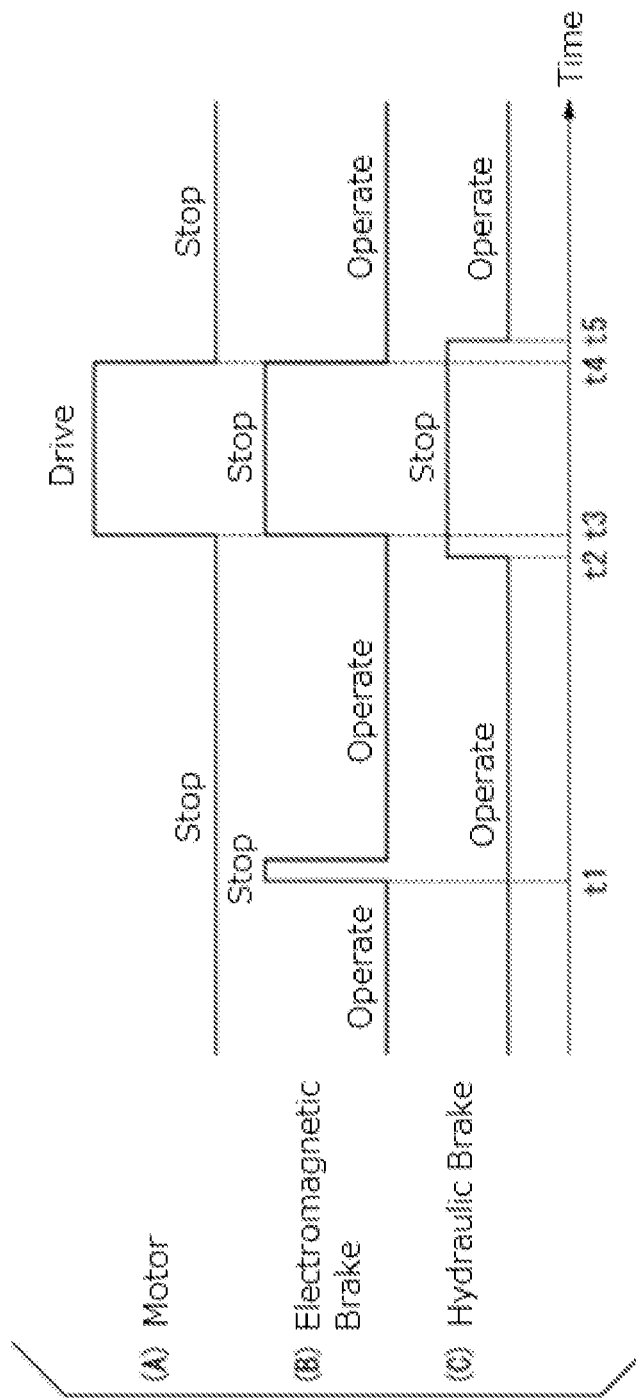
FIG. 8 shows another example of operation for controlling the braking force according to the embodiment. Part (A) of FIG. 8 shows a change in a control signal provided to a motor drive unit. Part (B) of FIG. 8 shows a change in a control signal provided to the motor brake unit (an electromagnetic brake). Part (C) of FIG. 8 shows a change in a control signal provided to a hydraulic brake driving unit 52.

FIG. 8 shows another example of operation for controlling the braking force according to the embodiment. Part (A) of FIG. 8 shows a change in a control signal provided to the motor drive unit 162. Part (B) of FIG. 8 shows a change in a control signal provided to the motor brake unit 160 (the electromagnetic brake). Part (C) of FIG. 8 shows a change in a control signal provided to the hydraulic brake driving unit 52.

The yaw drive device 100 may temporarily reduce the braking force of the electromagnetic brake when a predetermined timing (t1) is reached during the period in which the nacelle 10 is stopped relative to the tower 20. The predetermined timing may be reached, for example, at regular intervals within the stop period. The yaw drive device 100 then reduces the braking force of the hydraulic brake at time t2 within the drive period, and the yaw drive device 100 reduces the braking force of the electromagnetic brake and causes the drive force to be generated at time t3. The yaw drive device 100 stops the drive of the motor drive unit 162 and causes the braking force to be generated at time t4 within the drive period, and then actuates the braking force of the hydraulic brake at time t5. In this way, even when there is possibility that a large load occurs between the ring gear 22 and the pinion gear 150 due to a gust of wind during the stop period after the drive period, the yaw drive device 100 may temporarily reduce the braking force of the electromagnetic brake to reduce the load. The yaw drive device 100 is thus capable of preventing a large load without sensing the load between the ring gear 22 and the pinion gear 150.

Figure 9:
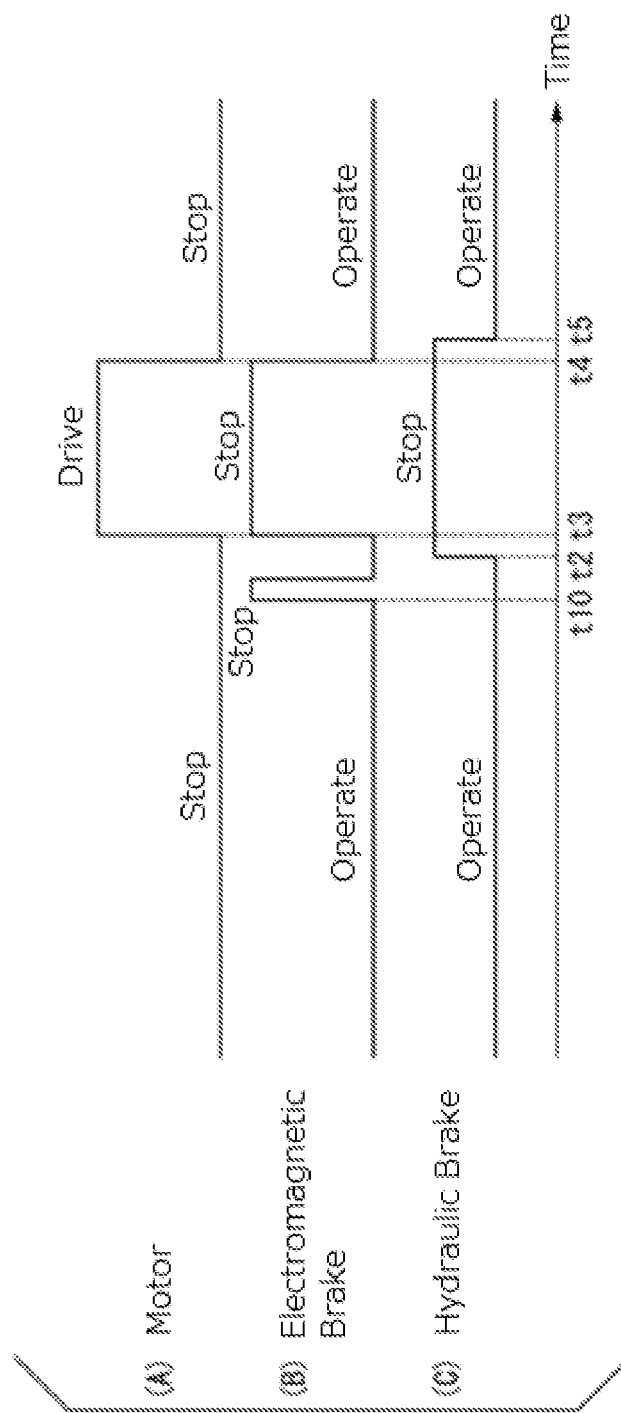
FIG. 9 shows another example of operation for controlling the braking force according to the embodiment. Part (A) of FIG. 9 shows a change in a control signal provided to the motor drive unit. Part (B) of FIG. 9 shows a change in a control signal provided to the motor brake unit (an electromagnetic brake). Part (C) of FIG. 9 shows a change in a control signal provided to the hydraulic brake driving unit 52.

FIG. 9 shows another example of operation for controlling the braking force according to the embodiment. Part (A) of FIG. 9 shows a change in a control signal provided to the motor drive unit 162. Part (B) of FIG. 9 shows a change in a control signal provided to the motor brake unit 160 (the electromagnetic brake). Part (C) of FIG. 9 shows a change in a control signal provided to the hydraulic brake driving unit 52.

The yaw drive device 100 may temporarily reduce the braking force of the electromagnetic brake when a predetermined timing (t10) before the start of the drive period is reached during the period in which the nacelle 10 is stopped relative to the tower 20. The yaw drive device 100 then reduces the braking force of the hydraulic brake at time t2 within the drive period, and the yaw drive device 100 reduces the braking force of the electromagnetic brake and causes the drive force to be generated at time t3. The yaw drive device 100 stops the drive of the motor drive unit 162 and causes the braking force to be generated at time t4 within the drive period, and then actuates the braking force of the hydraulic brake at time t5. In this way, the yaw drive device 100 is prevented from driving the pinion gear 150 under a large load received during the stop period. As a result, the yaw drive device 100 is prevented from having a malfunction occurring when the drive of the pinion gear 150 is started.

Figure 10:
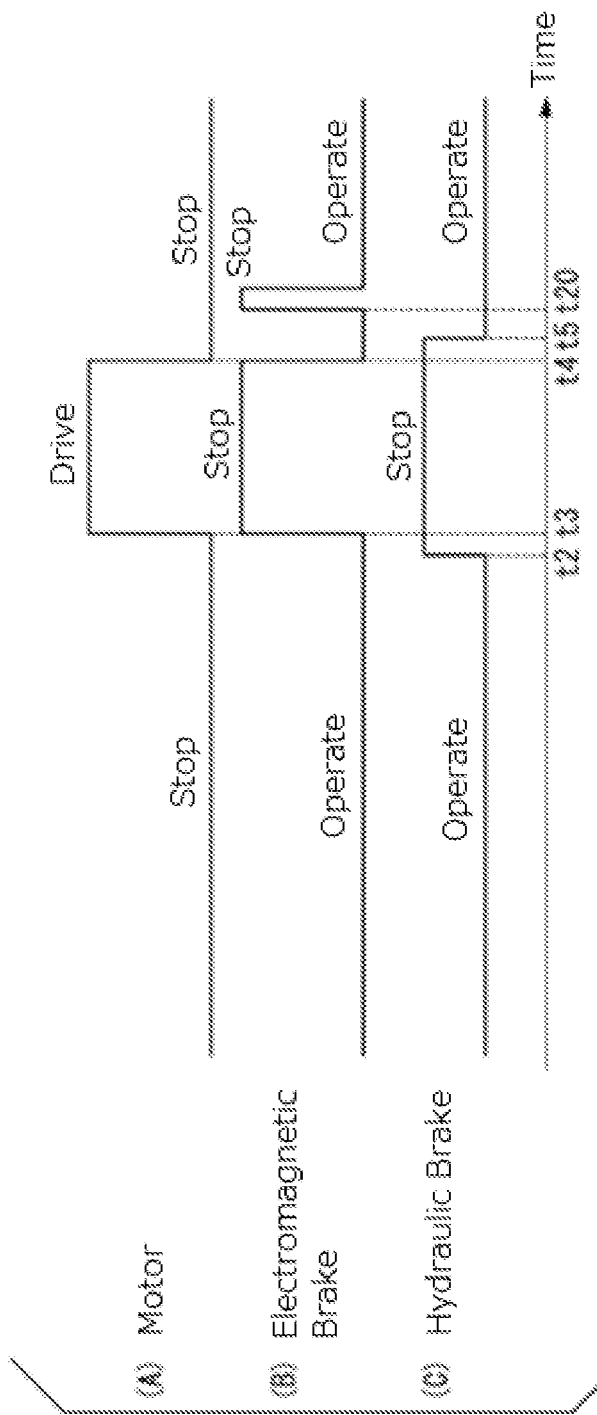
FIG. 10 shows another example of operation for controlling the braking force according to the embodiment. Part (A) of FIG. 10 shows a change in a control signal provided to the motor drive unit. Part (B) of FIG. 10 shows a change in a control signal provided to the motor brake unit (an electromagnetic brake). Part (C) of FIG. 10 shows a change in a control signal provided to the hydraulic brake driving unit 52.

FIG. 10 shows another example of operation for controlling the braking force according to the embodiment. Part (A) of FIG. 10 shows a change in a control signal provided to the motor drive unit 162. Part (B) of FIG. 10 shows a change in a control signal provided to the motor brake unit 160 (the electromagnetic brake). Part (C) of FIG. 10 shows a change in a control signal provided to the hydraulic brake driving unit 52.

The yaw drive device 100 may temporarily reduce the braking force of the electromagnetic brake when a predetermined timing (t20) after the end of the drive period is reached during the period in which the nacelle 10 is stopped relative to the tower 20. This operation inhibits and eliminates the variation of the loads among the yaw drive devices 100 caused by the difference in the brake timing and variation in the meshing condition among the yaw drive devices 100. As a result, the load can be uniformed among the yaw drive devices 100.

The control operations referring to FIGS. 8, 9, and 10 may be combined together. Specifically, the control unit 170 may temporarily reduce the braking force of the electromagnetic brake at at least one of a timing reached at regular intervals, a timing reached before the start of the drive period, and a timing reached after the end of the drive period, during the period in which the nacelle 10 is stopped relative to the tower 20.

Figure 11:
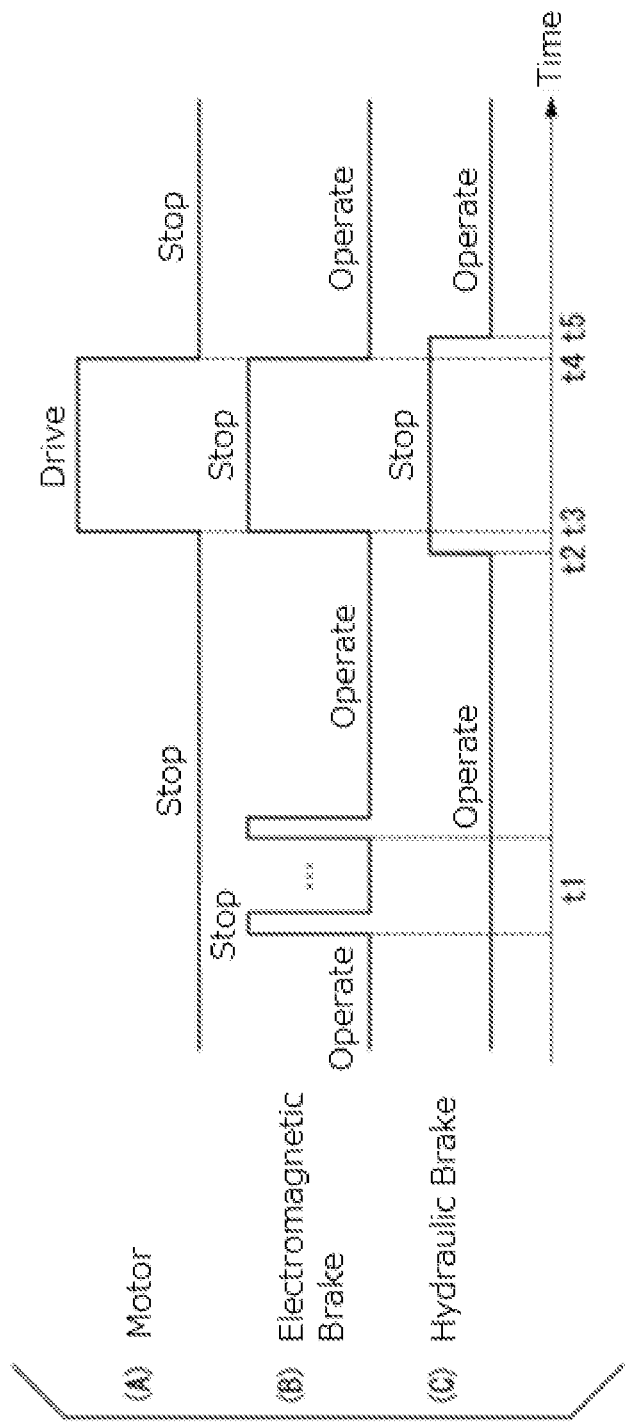
FIG. 11 shows another example of operation for controlling the braking force according to the embodiment. Part (A) of FIG. 11 shows a change in a control signal provided to the motor drive unit. Part (B) of FIG. 11 shows a change in a control signal provided to the motor brake unit (an electromagnetic brake). Part (C) of FIG. 11 shows a change in a control signal provided to the hydraulic brake driving unit 52.

FIG. 11 shows another example of operation for controlling the braking force according to the embodiment. Part (A) of FIG. 11 shows a change in a control signal provided to the motor drive unit 162. Part (B) of FIG. 11 shows a change in a control signal provided to the motor brake unit 160 (the electromagnetic brake). Part (C) of FIG. 11 shows a change in a control signal provided to the hydraulic brake driving unit 52. When a predetermined timing is reached, the control unit 170 may provide a pulse signal to the motor brake unit 160 (the electromagnetic brake) for a plurality of times. The control unit 170 may provide a pulse signal to the motor brake unit 160 (the electromagnetic brake) for a plurality of times at preset pulse intervals. Alternatively, the control unit 170 may provide a pulse signal to the motor brake unit 160 (the electromagnetic brake) for a plurality of times until the value based on the load sensed by the strain sensors 166 falls below a threshold value. In this way, the yaw drive device 100 can divide the operation for reducing the load into a plurality of runs. The process for controlling the braking force may include a process of performing duty control of the control signal provided to the electromagnetic brake. This can reduce the amount of electric power supplied to the electromagnetic brake, thereby to cause the force generated by the electromagnetic brake to be reduced or zero.

Figure 12:
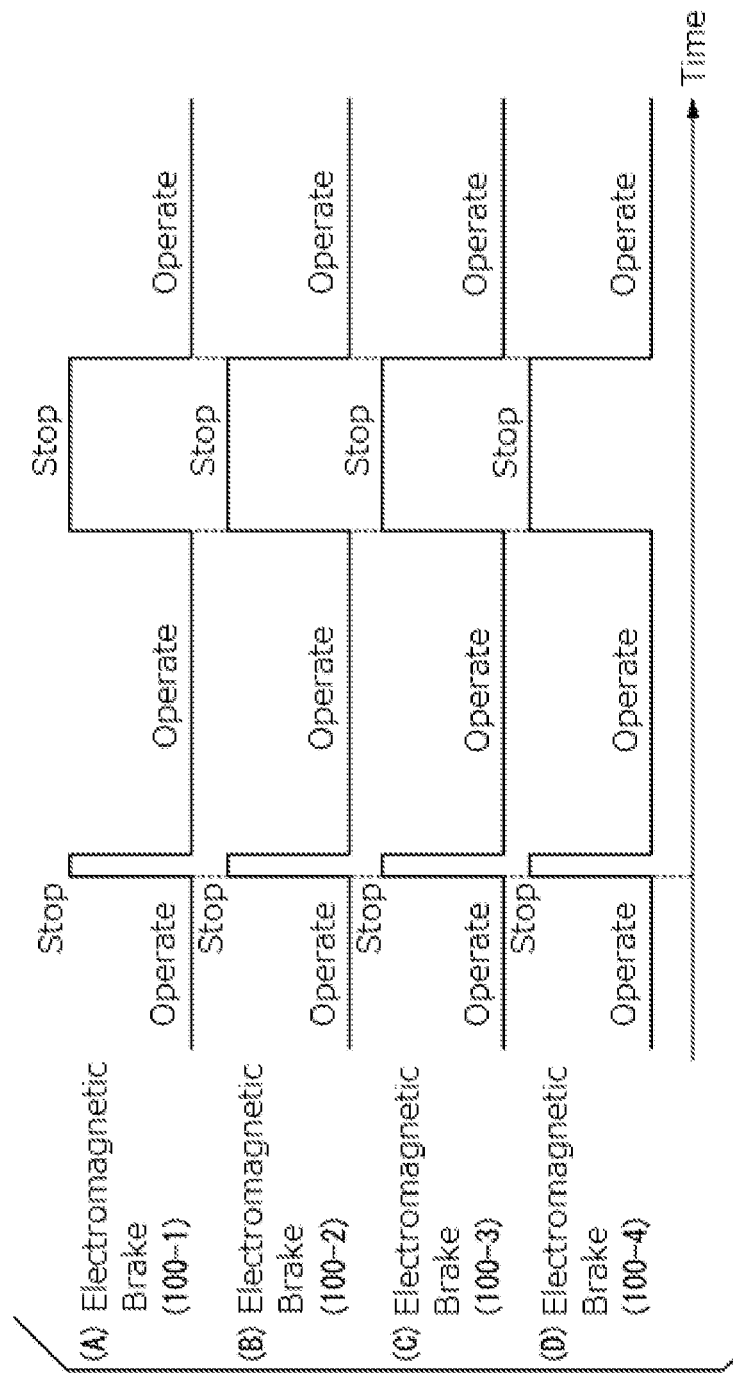
FIG. 12 shows another example of operation for controlling the braking force according to the embodiment. Part (A) of FIG. 12 shows a change in a control signal provided to the motor brake unit in a yaw drive device 100-1. Part (B) of FIG. 12 shows a change in a control signal provided to the motor brake unit in a yaw drive device 100-2. Part (C) of FIG. 12 shows a change in a control signal provided to the motor brake unit in a yaw drive device 100-3. Part (D) of FIG. 12 shows a change in a control signal provided to the motor brake unit 160 in a yaw drive device 100-4.
Figure 13:
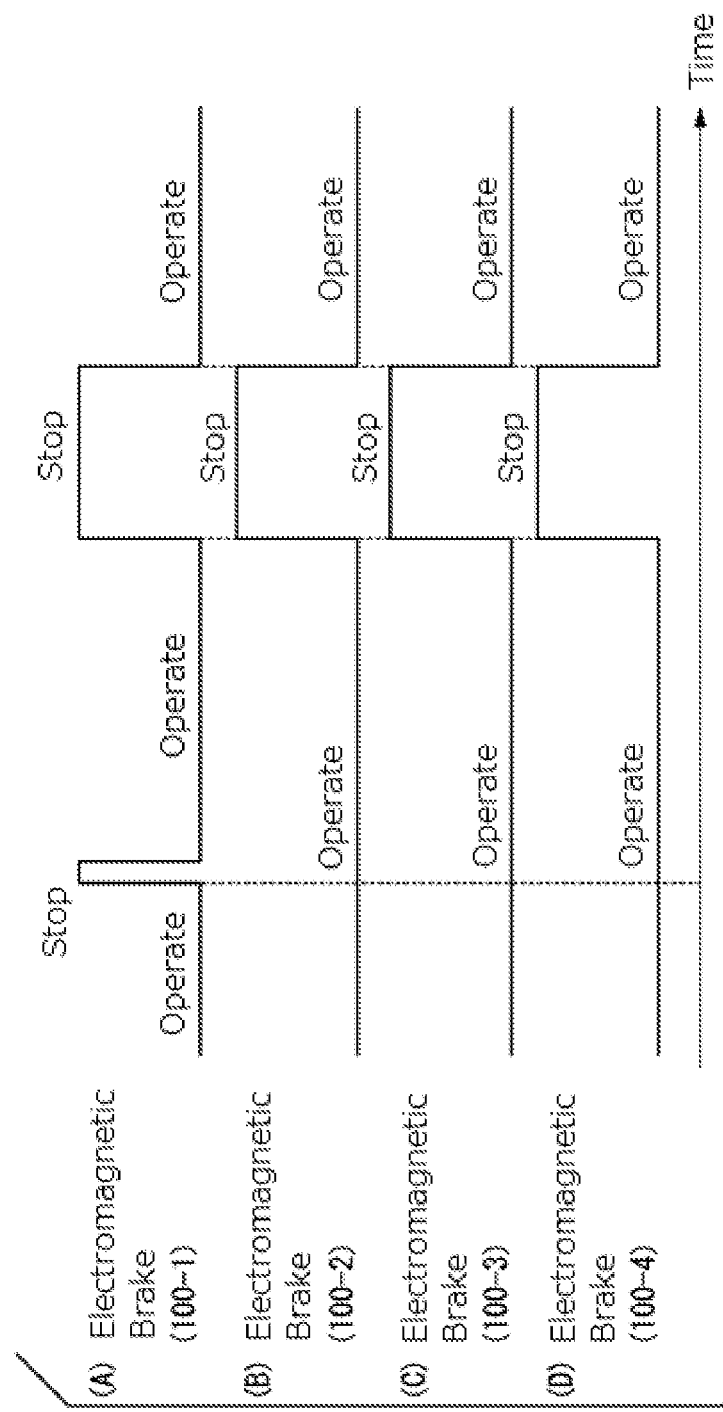
FIG. 13 shows another example of operation for controlling the braking force according to the embodiment. Part (A) of FIG. 13 shows a change in a control signal provided to the motor brake unit in the yaw drive device 100-1. Part (B) of FIG. 13 shows a change in a control signal provided to the motor brake unit in the yaw drive device 100-2. Part (C) of FIG. 13 shows a change in a control signal provided to the motor brake unit in the yaw drive device 100-3. Part (D) of FIG. 13 shows a change in a control signal provided to the motor brake unit 160 in the yaw drive device 100-4.

FIGS. 12 and 13 show another example of operation for controlling the braking force according to the embodiment. Part (A) of FIG. 12 and Part (A) of FIG. 13 show a change in a control signal provided to the motor brake unit 160 in the yaw drive device 100-1. Part (B) of FIG. 12 and Part (B) of FIG. 13 show a change in a control signal provided to the motor brake unit 160 in the yaw drive device 100-2. Part (C) of FIG. 12 and Part (C) of FIG. 13 show a change in a control signal provided to the motor brake unit 160 in the yaw drive device 100-3. Part (D) of FIG. 12 and Part (D) of FIG. 13 show a change in a control signal provided to the motor brake unit 160 in the yaw drive device 100-4. As shown in FIG. 12, when a predetermined timing is reached, the control unit 170 may provide a control signal to a plurality of motor brake units 160 to reduce the braking forces. As shown in FIG. 13, when a predetermined timing is reached, the control unit 170 may provide a control signal to a part of a plurality of motor brake units 160 to reduce the braking forces. When the load is equal to or larger than the threshold value, the control unit 170 may provide a control signal to all or a part of the motor brake units 160 to reduce the braking forces.

According to the embodiment described above, it is possible to realize a wind turbine drive control device for controlling at least one yaw drive device 100 for moving two structures (the nacelle 10 and the tower 20) included in a wind power generation device 1 relative to each other, the wind turbine drive control device comprising: an obtaining unit 166 for obtaining information related to a load occurring between the at least one yaw drive device 100 and one of the two structures that receives a force generated by the at least one yaw drive device 100; and a control unit 170 for controlling the at least one yaw drive device 100 so as to cause a force generated by the at least one yaw drive device 100 to be reduced or zero based on the information related to the load obtained by the obtaining unit during a stop period in which the two structures are stopped relative to each other. In this way, according to the embodiment, the load occurring between the nacelle 10 and the tower 20 can be reduced during the stop period.

According to the embodiment, even when the control unit 170 performs control for switching between the drive period in which the nacelle 10 is moved to the target position and the stop period in which the nacelle 10 is stopped at the target position, the braking force can be temporarily reduced during the stop period in which the braking force should not be reduced.

According to the embodiment, the information related to the load is based on the force acting on the strain sensors 166 that fix the yaw drive device 100 to one of the two structures, and therefore, the information related to the load can be obtained using the force acting on the strain sensors 166.

According to the embodiment, it is possible to realize a wind turbine drive control device for controlling at least one yaw drive device 100 for moving two structures included in a wind power generation device 1 relative to each other, the wind turbine drive control device comprising: a control unit 170 for controlling the at least one yaw drive device 100 so as to cause a force generated by the at least one yaw drive device 100 to be reduced or zero when a predetermined timing is reached during a stop period in which the two structures are stopped relative to each other. With this configuration, the load occurring in the stop period can be reduced before the stop period is ended. According to this embodiment, the load can be uniformly distributed to a plurality of yaw drive devices 100, and thus a large load occurring in the stop period is not concentrated on a particular yaw drive device 100. Further, according to the embodiment, the lives of the yaw drive devices 100 and the ring gear 22 can be prolonged by uniformly distributing the load to the plurality of yaw drive devices 100 rather than by inhibiting an excess load from occurring in a particular yaw drive device 100.

According to the embodiment, the predetermined timing is a timing reached at regular intervals within the stop period, and therefore, the load occurring in the stop period can be reduced at regular intervals.

According to the embodiment, the predetermined timing is a timing reached a predetermined amount of time before a start of the drive period in which the two structures are moved relative to each other, and therefore, the load can be reduced during the stop period, a predetermined amount of time before the start of the drive period. In this way, according to the embodiment, it can be prevented to start driving under a large load.

According to the embodiment, the predetermined timing is a timing reached a predetermined amount of time after an end of the drive period in which the two structures are moved relative to each other, and therefore, the load can be reduced during the stop period, a predetermined amount of time after the end of the drive period. This operation reduces the variation of the loads among the yaw drive devices 100 caused by the difference in the brake timing and variation in the meshing condition among the yaw drive devices 100.

According to the embodiment, it is possible to realize a wind turbine drive control device for controlling a plurality of yaw drive devices 100 for moving two structures included in a wind power generation device 1 relative to each other, the wind turbine drive control device comprising: an obtaining unit 166 for obtaining information related to a load occurring between each of the plurality of yaw drive devices 100 and one of the two structures that receives forces generated by the plurality of yaw drive devices 100; and a control unit 170 for controlling the plurality of yaw drive devices 100 so as to cause a force generated by at least one of the plurality of yaw drive devices 100 to be reduced or zero based on the information related to the load obtained by the obtaining unit 166 during a stop period in which the two structures are stopped relative to each other. According to the embodiment, the load can be reduced during the stop period in accordance with the information related to the load.

According to the embodiment, it is possible to realize a wind turbine drive control device for controlling a plurality of yaw drive devices 100 each including a motor brake unit 160 and a motor drive unit 162, the motor brake unit 160 being configured to generate a braking force for stopping the nacelle 10 relative to the tower 20, both the nacelle 10 and the tower 20 being included in a wind power generation device, the motor drive unit 162 being configured to generate a drive force for moving the nacelle 10 relative to the tower 20, the wind turbine drive control device comprising: a control unit 170 configured to switch between a drive period in which the nacelle 10 is moved relative to the tower 20 and a stop period in which the nacelle 10 is stopped relative to the tower 20, the control unit 170 being further configured to control the plurality of yaw drive devices 100 so as to cause a force generated by at least one of the plurality of yaw drive devices 100 to be reduced or zero when a predetermined timing is reached during the stop period. According to the embodiment, the load can be reduced during the stop period in accordance with the information related to the load.

According to the embodiment, it is possible to realize a control method of a wind turbine drive device, for controlling a yaw drive device 100 for moving two structures (10, 20) included in a wind power generation device 1 relative to each other, the control method comprising: obtaining information related to a load occurring between the yaw drive device 100 and one of the two structures (10, 20) that receives a force generated by the yaw drive device 100; and controlling the yaw drive device 100 so as to cause a force generated by the yaw drive device 100 to be reduced or zero based on the information related to the load during a stop period in which the two structures (10, 20) are stopped relative to each other. With this method, the load can be reduced during the stop period in accordance with the information related to the load.

According to the embodiment, it is possible to realize a control method of a wind turbine drive device, for controlling a yaw drive device 100 for moving two structures (10, 20) included in a wind power generation device 1 relative to each other, the control method comprising: controlling the yaw drive device 100 so as to cause a force generated by the yaw drive device 100 to be reduced or zero when a predetermined timing is reached during a stop period in which the two structures (10, 20) are stopped relative to each other. With this method, the load can be reduced during the stop period in accordance with the information related to the load.

The functions of the control unit 170 according to the embodiment described above may be implemented in a program stored on a computer-readable storage medium, and the program stored on the storage medium may be loaded onto a computer system that then executes the program for processing. The "computer system" mentioned above may include an operating system (OS) or hardware such as peripheral devices. The "computer-readable storage medium" mentioned above refers to a storage device such as a portable medium like a flexible disc, a magneto-optical disc, a ROM (Read Only Memory), a flash memory or other writable non-volatile memory, and a DVD (Digital Versatile Disc), and a hard disk built-in to the computer system.

Further, the "computer-readable storage medium" includes storage media that retain the program for some period of time, like a volatile memory (for example, DRAM (Dynamic Random Access Memory)) in an information processing device receiving the program through a network such as the Internet or a communication line such as a telephone line, and a computer system that operates as a client. The computer program mentioned above may be transmitted from a computer system that includes a storage device or the like storing the program to another computer system through a transmission medium or by a transmission wave in a transmission medium. The "transmission medium" for transmitting the program refers to a medium that operates to transmit information, like a network (communication network) such as the Internet or a communication line (communication wire) such as the telephone line. Only a part of the functions described above may be implemented in the above program. Further, the functions described above may be implemented by a combination of the above program and programs previously stored on the computer system. That is, the above program may be what is called a difference file (a difference program). The foregoing is the description of the embodiments of the present invention with reference to the drawings. Specific configurations are not limited to the above embodiments but include design modifications within the purport of the present invention.

What is claimed is:

1. A wind turbine drive control device for controlling at least one drive device for moving two structures included in a wind power generation device relative to each other, the at least one drive device comprising an electromagnetic brake, and the wind power generation device comprising a hydraulic brake, the wind turbine drive control device comprising:
- a sensor configured to obtain information related to a load occurring between the at least one drive device and one of the two structures that receives a force generated by the at least one drive device; and
- control circuitry configured to, during a stop period in which the two structures are stopped relative to each other, control the at least one drive device, in a state where a process is performed from a first state, in which both a first force generated by the electromagnetic brake and a second force generated by the hydraulic brake are generated, to a second state, in which only the first force generated by the electromagnetic brake is temporarily reduced or zero based on the obtained information, while causing the second force generated by the hydraulic brake to be applied to fix the two structures relative to each other, to regenerate the first force generated by the electromagnetic brake while causing the second force generated by the hydraulic brake to be applied.

2. The wind turbine drive control device of claim 1, wherein the information related to the load is information based on a force acting on a fastener fixing the at least one drive device to one of the two structures.

3. The wind turbine drive control device of claim 1, wherein the at least one drive device comprises a plurality of drive devices, each controlled by the wind turbine drive control device,
- wherein the sensor is configured to obtain information related to the load occurring between each of the plurality of drive devices and one of the two structures that receives forces generated by the plurality of drive devices, and
- wherein the control circuitry is configured to control the plurality of drive devices, in the state where the process is performed from the first state to the second state, to regenerate the first force generated by the electromagnetic brake while causing the second force generated by the hydraulic brake to be applied.

4. The wind turbine drive control device of claim 1, wherein the control circuitry is configured to control the at least one drive device so as to cause the first force to be temporarily reduced or zero for at least several microseconds, while causing the second force to be applied to fix the two structures relative to each other.

5. The wind turbine drive control device of claim 1, wherein the electromagnetic brake applies the braking force to a ring gear by an electromagnetic action,
- wherein the hydraulic brake applies the braking force by urging a friction member against the ring gear, and
- wherein the second state indicates a state in which the braking force, which is greater than the load generated between the at least one drive device and one of the two structures and which is applied by urging the friction member, is applied.

6. A wind turbine drive control device for controlling a plurality of drive devices each including a brake unit, a drive unit, and a transmission unit, the brake unit being configured to generate a braking force for stopping a second structure relative to a first structure, the brake unit of at least one drive device of the plurality of drive devices comprising an electromagnetic brake, both the first and second structures being included in a wind power generation device, the wind power generation device comprising a hydraulic brake, the drive unit being configured to generate a drive force for moving the second structure relative to the first structure, and the transmission unit being configured to transmit the braking force and the drive force to the first structure, the wind turbine drive control device comprising:
- a sensor configured to obtain information based on a force acting on a fastener fixing the plurality of drive devices to the second structure; and
- control circuitry configured to switch between a drive period in which the second structure is moved relative to the first structure and a stop period in which the second structure is stopped relative to the first structure, the control circuitry being further configured to, during the stop period, control the at least one drive device, in a state where a process is performed from a first state, in which both a first force generated by the electromagnetic brake and a second force generated by the hydraulic brake are generated, to a second state, in which only the first force generated by the electromagnetic brake is temporarily reduced or zero based on the obtained information, while causing the second force generated by the hydraulic brake to be applied to fix the first structure and the second structure relative to each other, to regenerate the first force generated by the electromagnetic brake while causing the second force generated by the hydraulic brake to be applied.

7. A control method of a wind turbine drive device, for controlling at least one drive device for moving two structures included in a wind power generation device relative to each other, the at least one drive device comprising an electromagnetic brake, and the wind power generation device comprising a hydraulic brake, the control method comprising:
- obtaining information related to a load occurring between the at least one drive device and one of the two structures that receives a force generated by the at least one drive device; and
- during a stop period in which the two structures are stopped relative to each other, controlling the at least one drive device, in a state where a process is performed from a first state, in which both a first force generated by the electromagnetic brake and a second force generated by the hydraulic brake are generated, to a second state, in which only the first force generated by the electromagnetic brake is temporarily reduced or zero based on the obtained information, while causing the second force generated by the hydraulic brake to be applied to fix the two structures relative to each other, to regenerate the first force generated by the electromagnetic brake while causing the second force generated by the hydraulic brake to be applied.

* * * * *